(12) United States Patent
Sawamoto et al.

(10) Patent No.: US 10,443,654 B2
(45) Date of Patent: Oct. 15, 2019

(54) BEARING AND SCROLL-TYPE FLUID MACHINE

(71) Applicant: TAIHO KOGYO CO., LTD., Toyota-shi, Aichi (JP)

(72) Inventors: Akira Sawamoto, Toyota (JP); Masanori Akizuki, Toyota (JP)

(73) Assignee: TAIHO KOGYO CO., LTD., Toyota-shi, Aichi (JP)

( * ) Notice: Subject to any disclaimer, the term of this patent is extended or adjusted under 35 U.S.C. 154(b) by 42 days.

(21) Appl. No.: 15/123,081

(22) PCT Filed: Mar. 5, 2015

(86) PCT No.: PCT/JP2015/056491
§ 371 (c)(1),
(2) Date: Sep. 1, 2016

(87) PCT Pub. No.: WO2015/133571
PCT Pub. Date: Sep. 11, 2015

(65) Prior Publication Data
US 2017/0067508 A1    Mar. 9, 2017

(30) Foreign Application Priority Data

Mar. 6, 2014    (JP) .................................. 2014-043909

(51) Int. Cl.
*F16C 33/20*    (2006.01)
*F16C 33/36*    (2006.01)
(Continued)

(52) U.S. Cl.
CPC ........ *F16C 33/201* (2013.01); *F04C 18/0215* (2013.01); *F04C 29/0085* (2013.01);
(Continued)

(58) Field of Classification Search
CPC ...... F16C 33/201; F16C 17/02; F16C 33/208; F16C 9/02; F16C 33/205; F16C 33/203; F16C 33/36
(Continued)

(56) References Cited

U.S. PATENT DOCUMENTS 4,995,735 A * 2/1991 Dansdill ................. F16C 33/10
384/276
5,620,262 A    4/1997 Kumada et al.
(Continued)

FOREIGN PATENT DOCUMENTS

EP    1281881 A1    2/2003
EP    2 636 914 A1    9/2013
(Continued)

OTHER PUBLICATIONS

International Search Report for PCT/JP2015/056491 (2 pgs).
(Continued)

*Primary Examiner* — Deming Wan
(74) *Attorney, Agent, or Firm* — Flynn Thiel, P.C.

(57) ABSTRACT

Bearing 11 has base material 110 and coating layer 111. Base material 110 contains crank shaft 13 on an inner circumferential surface side. The inner circumferential surface of base material 110 is coated with coating layer 111. The inner circumferential surface side of base material 110 is coated with a resin with a thickness t, the resin is dried, and thereafter surface treatment is carried out such that multiple grooves C are provided on the surface of the resin so as to intersect with the direction of crank shaft 13, whereby coating layer 111 is formed. Peak portions B formed between adjacent grooves C come into contact with the outer circumferential surface of crank shaft 13 to support crank shaft 13. With bearing 11, the thickness of peak portions B
(Continued)

at the center in the direction of the crank shaft 13 differs from the thickness of peak portions B at the end.

7 Claims, 5 Drawing Sheets

(51) Int. Cl.
*F16C 17/02* (2006.01)
*F16C 19/02* (2006.01)
*F16C 9/02* (2006.01)
*F04C 18/02* (2006.01)
*F04C 29/00* (2006.01)
*F16C 33/10* (2006.01)
*F16C 23/04* (2006.01)

(52) U.S. Cl.
CPC ............... *F16C 9/02* (2013.01); *F16C 17/02* (2013.01); *F16C 33/107* (2013.01); *F16C 33/205* (2013.01); *F16C 33/208* (2013.01); *F04C 2230/91* (2013.01); *F04C 2230/92* (2013.01); *F04C 2240/50* (2013.01); *F04C 2240/54* (2013.01); *F04C 2240/60* (2013.01); *F16C 23/041* (2013.01); *F16C 2208/10* (2013.01); *F16C 2208/60* (2013.01); *F16C 2240/42* (2013.01); *F16C 2360/42* (2013.01); *F16C 2360/43* (2013.01)

(58) Field of Classification Search
USPC ........ 418/55.1–55.6; 384/276, 283, 291, 192
See application file for complete search history.

(56) References Cited

U.S. PATENT DOCUMENTS

| | | | |
|---|---|---|---|
| 6,099,278 A | 8/2000 | Hugenroth et al. | |
| 6,109,899 A * | 8/2000 | Barito | F01C 21/02 384/192 |
| 8,545,102 B2 * | 10/2013 | Hayashi | F16C 17/02 29/898.043 |
| 2004/0146229 A1 * | 7/2004 | Kratzsch | F16C 33/043 384/276 |
| 2009/0165743 A1 * | 7/2009 | Kemnitz | F16C 33/201 123/193.6 |
| 2011/0164840 A1 | 7/2011 | Hayashi et al. | |
| 2014/0037236 A1 * | 2/2014 | Kobayakawa | F16C 33/22 384/397 |

FOREIGN PATENT DOCUMENTS

| | | |
|---|---|---|
| JP | 60-062625 | 5/1985 |
| JP | 03-249426 A | 11/1991 |
| JP | 05-256320 A | 10/1993 |
| JP | 10-259826 A | 9/1998 |
| JP | 2974044 B2 | 9/1999 |
| JP | 2001-289169 A | 10/2001 |
| JP | 2002266848 A | 9/2002 |
| JP | 2003-269454 A | 9/2003 |
| JP | 2005-256966 A | 9/2005 |
| JP | 2009162103 A | 7/2009 |
| JP | 2012-097838 A | 5/2012 |
| KR | 10-2008-0084972 | 9/2008 |
| KR | 1020110045094 A | 5/2011 |

OTHER PUBLICATIONS

Extended European Search Report for corresponding application No. 15758523.3, dated Oct. 18, 2017 (9 pgs).
Japanese Office Action and English translation thereof for corresponding application No. 2014-043909, dated Apr. 19, 2018 (7 pages).
Office Action issued in Indian Patent Office Application No. 201637029613, with English translation, dated May 27, 2019 (6 pages).
Chinese Office Action issued in Chinese Application No. 201580011976.1 with English translation dated Mar. 11, 2019 (14 pages).
Korean Office Action issued in Korean Application No. 10-2016-7027640 with English translation dated Feb. 27, 2019 (10 pages).
Japanese Office Action for corresponding Application No. 2014-043909, dated Dec. 4, 2018, including English translation thereof (5 pages).
Korean Office Action with English translation for corresponding application No. KR 10-2016-7027640, dated Oct. 24, 2018 (9 pgs.).

* cited by examiner

BEARING AND SCROLL-TYPE FLUID MACHINE

TECHNICAL FIELD

The present invention relates to a technique for suppressing the wear and seizure of a bearing used in a scroll-type fluid machine or the like.

BACKGROUND ART

A technique for suppressing the wear and seizure of a bearing used in a scroll-type fluid machine or the like has been considered. Patent Literature 1 discloses a scroll compressor having a bearing coated with a resin layer in which carbon particles are deposited. Patent Literature 2 discloses a sliding bearing that has a bearing alloy layer, an intermediate layer coating the surface of the bearing alloy layer, and an overlay layer coating the surface of the intermediate layer, and allows the overlay layer and intermediate layer, which remain in recessed portions of ring-shaped grooves provided in the bearing alloy layer, and peak portions of the bearing alloy layer to be exposed when worn from the surface side of the overlay layer, the height of the peak portions and the thickness of the overlay layer being set within a predetermined range.

CITATION LIST

Patent Literature

Patent Literature 1: U.S. Pat. No. 6,099,278
Patent Literature 2: Japanese Patent No. 2974044

SUMMARY OF INVENTION

Technical Problem

Incidentally, due to biased contact, wear and seizure are likely to occur in a bearing that supports a shaft on only one side with respect to a load point of the shaft, or in other words, "cantilevers" the shaft, for example. Wear and seizure of the bearing are often particularly problematic in scroll-type fluid machines in which a scroll member is revolved using the shaft. Also, even with a bearing that supports a shaft on both sides of the load point of the shaft, as with a bearing for an engine or the like, there are cases where the shaft deforms or warps when the load is high, resulting in biased contact, and wear and seizure sometimes occur in the bearing.

With the technique disclosed in Patent Document 1, there has been a problem in that the resin layer in which the carbon particles are deposited is in contact with the entire outer circumferential surface of the shaft, and therefore the area of contact between the shaft and the bearing is greater in comparison to the case where grooves are provided in the resin layer, and thus the resistance when the shaft rotates is greater. Also, with the technique described in Patent Document 2, there has been a problem in that if the shaft is inclined from an early stage presuming wear of the overlay layer, it is difficult to obtain an oil film and suppress wear.

It is an object of the present invention to suppress the wear and seizure of the bearing regardless of whether or not the shaft is inclined in the initial state.

Solution to Problem

In order to resolve the above-described problem, the bearing according to the present invention includes a tubular member for containing a shaft on an inner circumferential surface side; and a coating layer that coats the inner circumferential surface, a plurality of grooves being provided therein so as to intersect a direction of the shaft, and peak portions formed between the adjacent grooves coming into contact with an outer circumferential surface of the shaft so as to support the shaft, wherein a thickness of the peak portion at a center in the direction and a thickness of the peak portion at an end in the direction are different.

The thickness of the peak portion at the center in the direction may be thicker than the thickness of the peak portion at the end in the direction. Also, the thickness of the peak portion at the center in the direction may be thinner than the thickness of the peak portion at the end in the direction.

Also, a maximum value for a difference between the thinnest portions of the grooves may be smaller compared to a maximum value of a difference between the thicknesses of the peak portions.

Also, intervals of the grooves at the center and at the end in the direction may be different from each other.

Also, it is preferable that the maximum value for the difference between the thinnest portions of the grooves is smaller than a diameter tolerance of the shaft.

Also, it is preferable that in the coating layer, a region exists in which the interval of the grooves narrows and the peak portions become shallow as the end in the direction is approached.

Also, a scroll-type fluid machine according to the present invention includes the above-described bearing; a shaft supported by the bearing; a motor for rotating the shaft; a fixed scroll member that is provided with a spiral-shaped vane and is fixed to a housing; and a movable scroll member that is provided with a spiral-shaped vane whose spiral direction is the opposite of that of the vane of the fixed scroll member, forms a compression chamber along with the fixed scroll member, and is revolved by the shaft.

Advantageous Effects of Invention

According to the present invention, it is possible to suppress the wear and seizure of the bearing regardless of whether or not the shaft is inclined in the initial state.

REFERENCE SIGNS LIST

Figure 1:
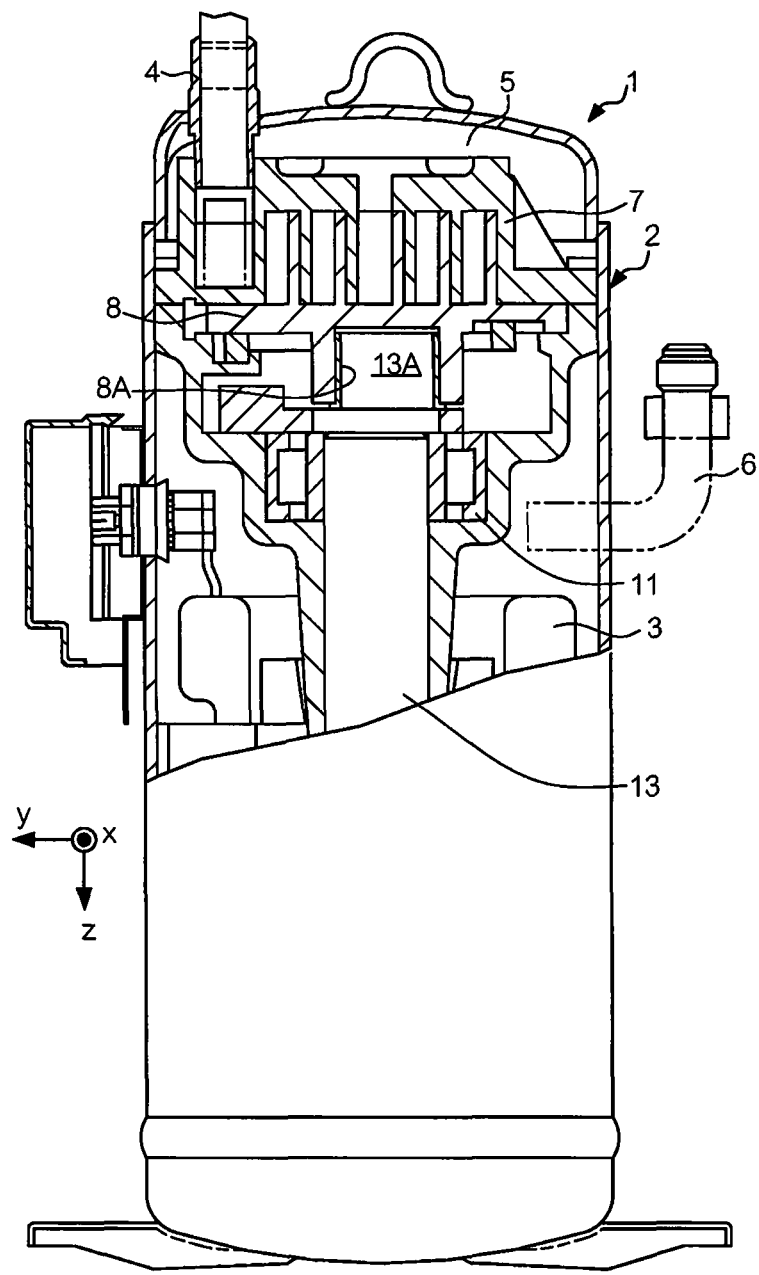
FIG. 1 is a partial cross-sectional view showing an overview of a scroll-type compressor according to an embodiment.

1 . . . Scroll-type compressor
11 . . . Bearing

110 . . . Base material
111 . . . Coating layer
13 . . . Crank shaft
13A . . . Crank pin
2 . . . Housing
3 . . . Motor
4 . . . Suction pipe
5 . . . Chamber
6 . . . Discharge pipe
7 . . . Fixed scroll member
8 . . . Movable scroll member
8A . . . Pin support
91 . . . Bearing
910 . . . Base material
911 . . . Coating layer
B . . . Peak portion
B1 to B5 . . . Contact surface
C . . . Groove
F0 to F4 . . . Surface
h0 to h5 . . . Depth
O11 . . . Center line
O13 . . . Center line
R0 to R3 . . . Region
t . . . Thickness

DESCRIPTION OF EMBODIMENTS

1. Embodiment (Structure of Scroll-Type Compressor)

Hereinafter, the structure of scroll-type compressor 1 according to an embodiment of the present invention will be described. In the diagram, the space in which the components of scroll-type compressor 1 are arranged is expressed as an xyz right-handed coordinate space. Among the coordinate signs shown in the drawing, the signs obtained by drawing a black circle in the middle of a white circle are arrows facing forward from the far side of the drawing. The direction along the x axis in the space is referred to as the x axis direction. Also, in the x axis direction, the direction in which the x component increases is referred to as the +x direction, and the direction in which the x component decreases is referred to as the −x direction. For the y and z components as well, the y axis direction, the +y direction, the −y direction, the z axis direction, the +z direction, and the −z direction are defined according to the definitions above.

FIG. 1 is a partial cross-sectional view showing an overview of scroll-type compressor 1. Scroll-type compressor 1 is a type of scroll-type fluid machine according to the present invention, and for example, is used to compress a gas such as a coolant gas in an air conditioner for automobile use, for home use, for railway use, or for business use.

Scroll-type compressor 1 includes cylindrical housing 2 having two closed ends. In the drawing, the center of housing 2 is arranged along the z axis. The +z direction is the downward direction, and the −z direction is the upward direction.

Suction pipe 4, which suctions air, is provided above housing 2 (−z direction), and outlet pipe 6, which discharges compressed air stored in chamber 5 inside housing 2, is provided on a side surface of housing 2. Also, bearing 11, which is fixed to housing 2, and crank shaft 13, which is supported so as to be able to rotate due to bearing 11, are arranged inside of housing 2 in a direction approximately along the z axis.

Fixed scroll member 7, which is provided with a spiral-shaped vane, is fixed in the upper portion inside housing 2 of scroll-type compressor 1. Movable scroll member 8, which is provided with a spiral-shaped vane whose spiral direction is the opposite of that of the vane of fixed scroll member 7, is arranged below fixed scroll member 7 so as to oppose fixed scroll member 7. Movable scroll member 8 forms a compression chamber along with fixed scroll member 7.

Crank pin 13A, which is off-center, is included in the upper portion of crank shaft 13. When crank shaft 13 is driven so as to rotate by motor 3, which is provided inside of housing 2, crank pin 13A turns. Crank pin 13A is housed in pin support 8A, which is provided on the lower side of movable scroll member 8, and movable scroll member 8 turns due to crank pin 13A turning.

When movable scroll member 8 turns, air suctioned through suction pipe 4 flows into the compression chamber formed by movable scroll member 8 and fixed scroll member 7, is compressed, and is stored in chamber 5. Then, scroll-type compressor 1 discharges the compressed air stored in chamber 5 to the outside from discharge pipe 6.

Figure 2:
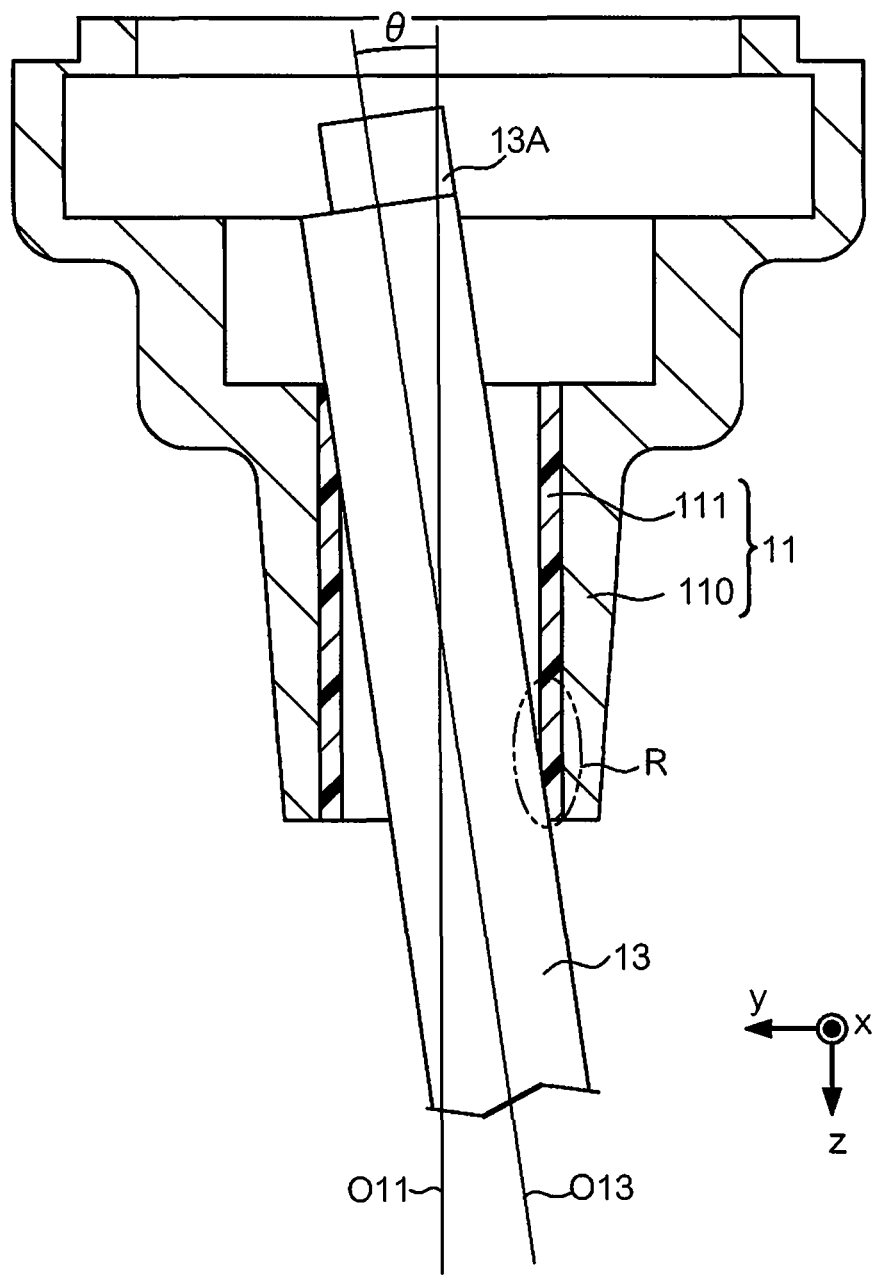
FIG. 2 is a diagram for illustrating an orientation of a crank shaft with respect to a bearing.

FIG. 2 is a diagram for illustrating the orientation of crank pin 13 with respect to pin support 11. As shown in FIG. 2, bearing 11 includes base material 110 and coating layer 111. Base material 110 has a tube-shaped part with openings at the top and bottom thereof, and among the opening portions of this part, the wall of the crank chamber is formed integrally with the opening portion on the upper side. Base material 110 may be formed of cast iron, or may be formed by carrying out various types of machining such as sintering, forging, cutting, pressing, and welding on various types of materials such as aluminum and stainless steel. Also, base material 110 may be made of a ceramic. Base material 110 contains crank shaft 13 on an inner circumferential surface side.

The inner circumferential surface of the above-described tube-shaped part of base material 110 is coated by coating layer 111. For example, coating layer 111 contains one or more of a polyamide-imide-based resin, polyimide-based resin, resins obtained through diisocyanate-modification, BPDA-modification, and sulfone-modification of these resins, epoxy resin, polyether ether ketone resin, phenol resin, polyamide, and elastomer as the binder resin. Also, for example, coating layer 111 may contain one or more of graphite, carbon, molybdenum disulfide, polytetrafluoroethylene, boron nitride, tungsten disulfide, fluorine-based resin, and a soft metal (e.g., Sn, Bi, etc.) as a solid lubricant.

Bearing 11 is such that the wall of the crank chamber is fixed to housing 2, and the center of housing 2 and the center of bearing 11 coincide with each other within a tolerance. On the other hand, in order to turn crank pin 13A, the center of crank shaft 13 is inclined with respect to the center of bearing 11. For example, as shown in FIG. 2, center line O13 of crank shaft 13 is inclined by angle θ with respect to center line O11 of bearing 11. Note that in the example shown in FIG. 2, for the sake of description, angle θ is shown as being larger than it actually is. Because crank shaft 13 is inclined with respect to bearing 11, the strength with which crank shaft 13 comes into contact with the inner circumferential surface of bearing 11 is sometimes biased in the z axis direction.

Figure 3:
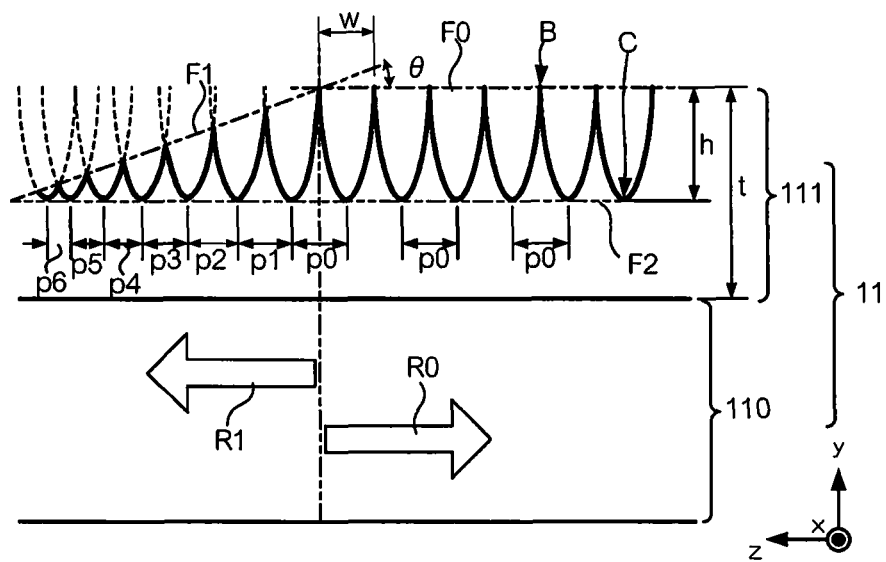
FIG. 3 is a conceptual diagram for illustrating a coating layer in a region R shown in FIG. 2.

FIG. 3 is a conceptual diagram for illustrating coating layer 111 in region R shown in FIG. 2. The cross-sectional view shown in FIG. 3 shows a cross section in a case of cutting bearing 11 at region R using a plane that is perpendicular to the x axis direction and passes through center line O11 shown in FIG. 2. In FIG. 3, the +z direction is the downward direction of FIGS. 1 and 2, and the −y direction is the direction of moving away from center line O11 of bearing 11. The inner circumferential surface side (+y direction side in FIG. 3) of base material 110 is coated with a resin with a thickness t, the resin is dried, and thereafter surface treatment is carried out such that multiple grooves C are provided on the surface of the resin so as to intersect with the direction of crank shaft 13, whereby coating layer 111 is formed. Grooves C have a cross-sectional shape similar to a U or a semicircle whose width is smaller at deeper positions and whose width changes more rapidly the closer to the bottom it is. Note that in order to simplify the description, the cross-sectional view of coating layer 111 shown in FIG. 3 is drawn such that the vertical direction (y axis direction) in the drawing is extended compared to that of actual coating layer 111.

Grooves C are formed by moving a blade tip of a cutting tool along the surface of coating layer 111 before being subjected to the surface treatment. Note that bearing 11 may be formed integrally, but it may also be obtained by combining a material divided into two or more parts by several planes or the like that pass through the center line O11. Also, bearing 11 may be formed into a cylindrical shape before the surface treatment, but it may also be formed into a cylindrical shape after the surface treatment.

The width w of grooves C is the width at depth h of grooves C. In region R0 shown in FIG. 3, an interval p0 between two adjacent grooves C is the same, and is 0.1 to 0.15 mm for example. The interval between grooves C is the length of a line segment connecting the centers of grooves C. Depth h is 1 to 20 μm, for example. Here, the center of groove C is the thinnest portion of groove C, and in region R0, the thickness thereof is (t−h). Peak portions B formed between adjacent grooves C come into contact with the outer circumferential surface of crank shaft 13 to support crank shaft 13.

In region R0 shown in FIG. 3, the width w of groove C is the same as interval p0 of groove C. In this case, the original surface of coating layer 111 no longer remains due to being cut off in the step of forming grooves C, or is only at the distal ends of peak portions B formed between adjacent grooves C. Because the distal ends are pointed and the area of contact with outer circumferential surface of crank shaft 13 is small, the frictional resistance of crank shaft 13 on coating layer 111 decreases. Also, because the distal ends of peak portions B that come into contact with the outer circumferential surface of crank shaft 13 are pointed, it is easy to cause elastic deformation and an oil film of lubricating oil is easy to form between peak portions B, which are elastically deformed, and crank shaft 13, and therefore the air-tightness of the contact portion improves.

In region R0, the thickness of coating layer 111 at the distal ends of peak portions B is the same because it is the thickness t of coating layer 111 before grooves C are formed. Accordingly, in region R0, surface F0 obtained by connecting the distal ends of peak portions B forms a circumferential surface centered about center line O11 shown in FIG. 2. If center line O13 of crank shaft 13 and center line O11 of bearing 11 coincide with each other, the outer circumferential surface of crank shaft 13 and surface F0 are not in biased contact, and the strength with which crank shaft 13 comes into contact with coating layer 111 is not likely to be biased in the z axis direction.

On the other hand, in region R1 shown in FIG. 3, the interval of grooves C is not constant. In region R1, grooves C are formed such that the interval decreases proceeding in the +z direction. For example, in region R1, the intervals of grooves C are intervals p1, p2, p3, p4, p5, p6, . . . , which are aligned in the stated order in the +z direction, and the magnitude relationship between these and interval p0 of region R0 is such that p0>p1>p2>p3>p4>p5>p6 is satisfied. For this reason, grooves C in region R1 are such that the distances between adjacent grooves C are smaller, peak portions B formed between the grooves C are cut to a larger extent, and the thicknesses of peak portions B are smaller the further in the +z direction they are. Accordingly, in region R1, surface F1 obtained by connecting the distal ends of peak portions B forms a circumferential surface centered about center line O13 shown in FIG. 2. In other words, in region R1, surface F1, which conforms to the outer circumferential surface of crank shaft 13 and is inclined with respect to base material 110 of bearing 11, is formed. In this case, region R1 is a region in which the intervals between grooves C are smaller and peak portions B are thinner as the end in the direction along crank shaft 13 in bearing 11 is approached.

Note that the distance between the centers of grooves C and base material 110 is kept constant even if the interval of grooves C decreases in the +z direction in region R1 shown in FIG. 3, and therefore surface F2 obtained by connecting the thinnest portions of grooves C is such that the distance between center line O11 of bearing 11 and surface F2 is the same in both region R0 and region R1. In other words, the thickness of the thinnest portion of groove C is (t−h) in both region R0 and region R1.

Here, because errors occur while grooves C are being formed, strictly speaking, it is not always the case that the thickness of the thinnest portions of grooves C will coincide with (t−h). However, in this embodiment, surface F1, which is inclined with respect to surface F0, is formed, and therefore the maximum value for the difference between the thicknesses of the thinnest portions of grooves C is at least smaller in comparison to the maximum value for the difference between the thicknesses of the peak portions over the entirety of region R0 and region R1.

Also, the maximum value for the difference between the thicknesses of the thinnest portions of grooves C may be made smaller than the diameter tolerance of crank shaft 13. By configuring the thickness of the thinnest portion of grooves C to be approximately the same over the entire z axis direction, there is less likely to be a difference in the strength of coating layer 111 in the z axis direction.

Figure 4:
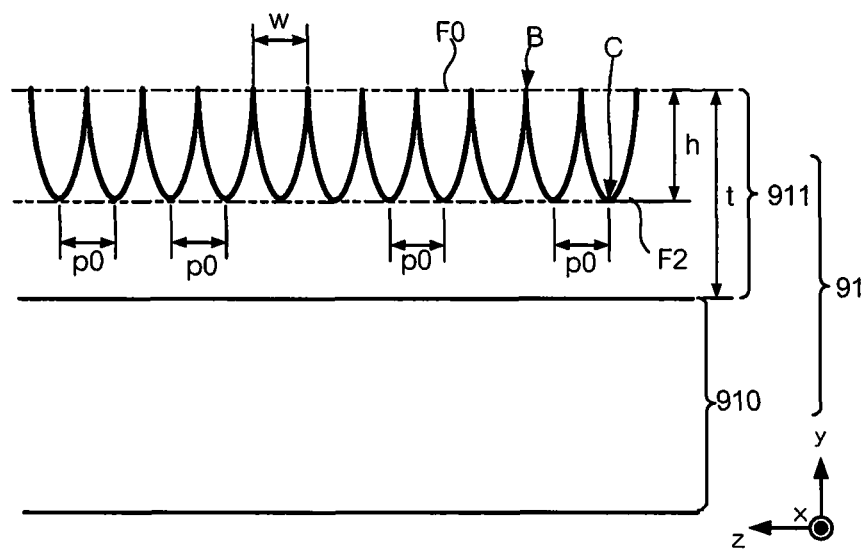
FIG. 4 is a diagram showing a coating layer in a case where grooves are formed at the same interval from one end of the bearing to the other end.

FIG. 4 is a diagram showing a coating layer in the case where grooves C are formed at the same interval p0 and the same depth h from one end to the other end of a bearing. Bearing 91 shown in FIG. 4 includes base material 910, which corresponds to the above-described base material 110, and coating layer 911, which corresponds to coating layer 111, and has the same configuration as the above-described bearing 11, except that interval p0 between grooves C and depth h are all the same at any position in the z axis direction. With bearing 91, interval p0 between grooves C and depths h of grooves C are all the same, and therefore the thicknesses of peak portions B are also the same.

Figure 5:
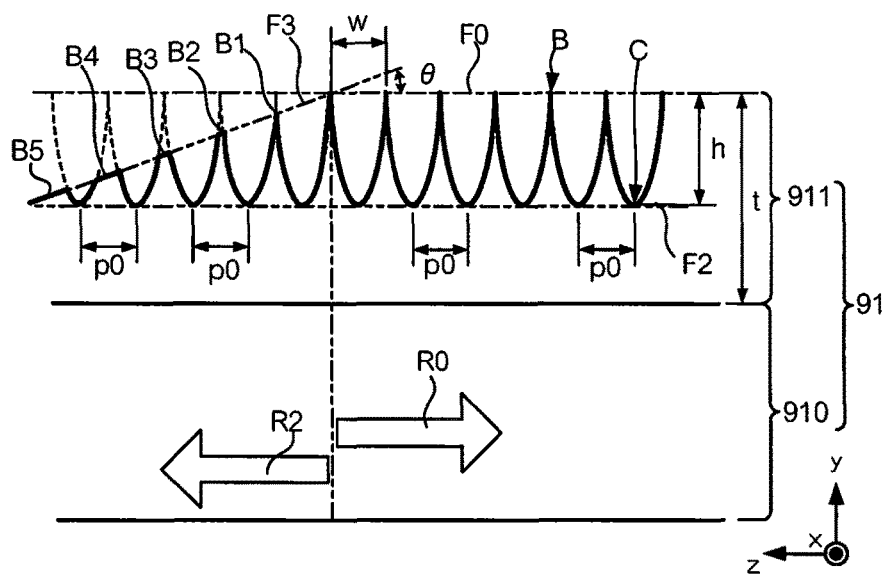
FIG. 5 is a diagram for illustrating a coating layer in a case where the crank shaft is inclined with respect to and comes into contact with the bearing shown in FIG. 4.

FIG. 5 is a diagram for illustrating coating layer 911 in the case where the crank shaft is inclined with respect to bearing 91 shown in FIG. 4. The crank shaft comes into contact with coating layer 911 at surface F3, which is inclined by angle θ with respect to surface F0 connecting the distal ends of peak portions B. Accordingly, because the crank shaft is in biased contact with bearing 91, region R2, with which the crank shaft strongly comes into contact, and region R0, in which the force of coming into contact is weaker than in region R2, are generated in coating layer 911. In region R2, the crank shaft strongly comes into contact, and therefore peak portions B are cut off, and contact surfaces B1, B2, B3, B4, and B5 appear. The surface areas thereof increase in the +z direction, and therefore the friction loss increases and it is easier to heat up in comparison to coating layer 111 in FIG. 3, in which the distal ends of peak portions B come into contact with the crank shaft. Also, since the lubricating oil is difficult to hold at contact surfaces B1 to B5, the oil film is less likely to be obtained between the crank shaft and coating layer 911, and seizure is more likely to occur.

On the other hand, if crank shaft 13 is not inclined, coating layer 111 shown in FIG. 3 is such that the distal ends of peak portions B come into contact with the crank shaft 13 in region R0, and if crank shaft 13 is inclined, the distal ends of peak portions B come into contact with crank shaft 13 in region R1, and therefore there is less friction loss than with coating layer 911 shown in FIG. 5, the lubricating oil is easily held, and heat generation and seizure are suppressed.

2. Modified Examples

Although an embodiment was described above, the content of the embodiment can be modified as follows. Also, the following modified examples may be combined.

2-1. Apparatus to be Applied to

In the above-described embodiment, an air conditioner for automobile use, home use, or business use was given as an apparatus to which scroll-type compressor 1 is applied, but scroll-type compressor 1 may be applied to a freezer machine, a refrigerating apparatus, or the like, and may also be applied to various types of apparatuses such as water temperature adjustment, a thermostat, a humidistat, painting equipment, a powder transport apparatus, a food treatment apparatus, and an air separation apparatus.

Also, in the above-described embodiment, bearing 11 was applied to scroll-type compressor 1, but it may also be applied to various types of scroll-type fluid machines, such as a fan, an expander, a supercharger, and a power generator. For example, if applied to an expander, it is sufficient to cause the movable scroll member 8 to revolve in the direction that is the opposite of the above-described revolution direction with respect to fixed scroll member 7. Accordingly, the gas handled by the scroll-type fluid machine flows into the space surrounded by the scroll members, is expanded, and is discharged in the direction that is the opposite of the above-described influx direction.

Also, the above-described bearing 11 may be applied to a machine other than a scroll-type fluid machine, such as an internal combustion engine, for example. The shaft supported by bearing 11 is not limited to being a crank shaft and is not limited to being a shaft that is cantilevered.

2-2. Groove Forming Means

In the above-described embodiment, grooves C were formed by moving the blade tip of a cutting tool along a surface of a resin layer and cutting off the resin layer, but the means for forming grooves C is not limited thereto. For example, grooves C may be formed using etching, a roller, or the like. Also, grooves C interposed between adjacent peak portions B may be formed by forming multiple peak portions B on the resin coating the inner circumferential surface of base material 110 using three-dimensional printing, or the like.

2-3. Interval of Grooves

In the above-described embodiment, region R1 existed in which the interval of grooves C decreased and distal ends of the peak portions interposed between adjacent grooves C became thinner as an end in the direction along the crank shaft 13 was approached, but it is sufficient that the intervals of grooves C at the center and at an end in the direction along crank shaft 13 are different from each other. For example, coating layer 111 may be configured such that the interval between two adjacent grooves C at an end portion differs from an interval between other grooves C. Accordingly, because peak portions B with different thicknesses are formed between adjacent grooves C at the center and an end in the direction along crank shaft 13, the likelihood that wear and seizure will occur due to crank shaft 13 being in biased contact with bearing 11 decreases.

Figure 6:
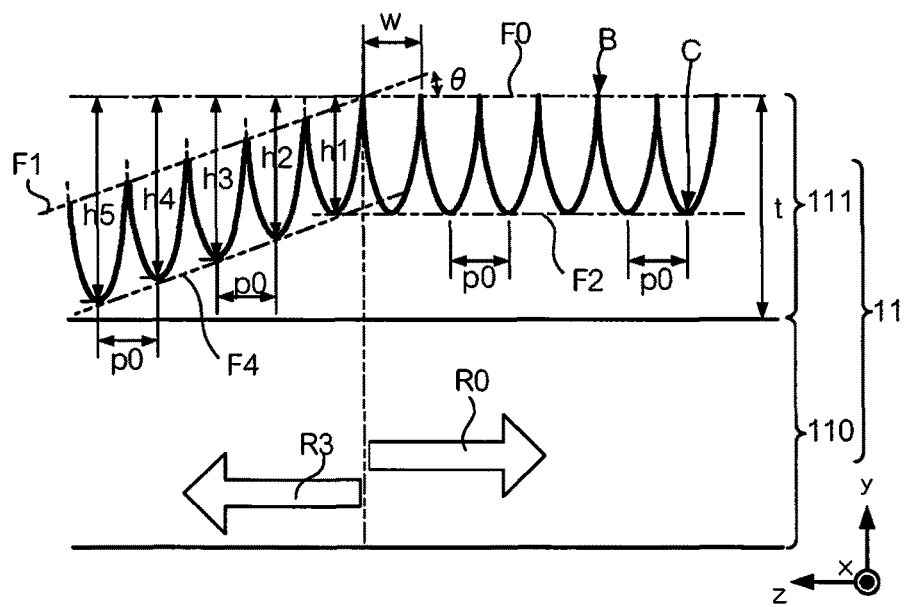
FIG. 6 is a diagram for illustrating a method of forming grooves according to a modified example.

Also, grooves C may be configured such that the interval of grooves C does not decrease near the ends. FIG. 6 is a diagram for illustrating a method of forming grooves C according to a modified example. Region R3 shown in FIG. 6 is a region near an end in a direction along crank shaft 13 in bearing 11, the end being in the +z direction. Interval p0 between grooves C is the same for both region R0 and region R3.

On the other hand, with bearing 11 shown in FIG. 6, the depth of grooves C increases (deepens) in the +z direction in region R3. For example, in region R3, the depths of grooves C are depths h1, h2, h3, h4, h5, . . . , which are aligned in the stated order in the +z direction, and the magnitude relationship between these and depth h0 in region R0 is such that $h0 \leq h1 < h2 < h3 < h4 < h5$ is satisfied. For this reason, in region R1, the positions of peak portions B formed between grooves C become deeper (i.e., closer to base material 110) in the +z direction. Accordingly, in region R3, surface F1 along the outer circumferential surface of crank shaft 13 that is inclined with respect to base material 110 of the bearing 11 is formed. Accordingly, the likelihood that wear and seizure will occur due to crank shaft 13 being in biased contact with bearing 11 decreases.

Note that because the depths of grooves C in region R3 shown in FIG. 6 increase in the +z direction, the distances between the centers of grooves C and base material 110 decreases. In other words, in region R3, surface F4 obtained by connecting the thinnest portions of grooves C is inclined with respect to surface F2 in region R0.

2-4. Surface that Connects Peak Portions

In the above-described embodiment, the surface obtained by connecting the distal ends of peak portions B was formed such that only one end of bearing 11, such as the end in the +z direction for example, is inclined with respect to center line O11 of bearing 11, but the surface may be formed such that both ends are inclined with respect to center line O11 of bearing 11. Also, surface F1 was linear when cut with a plane passing through the center line O11, but surface F1 may be curved. In short, it is sufficient that the thickness of peak portion B at the center in the direction of crank shaft 13 is different from the thickness of peak portion B at the end.

Figure 7:
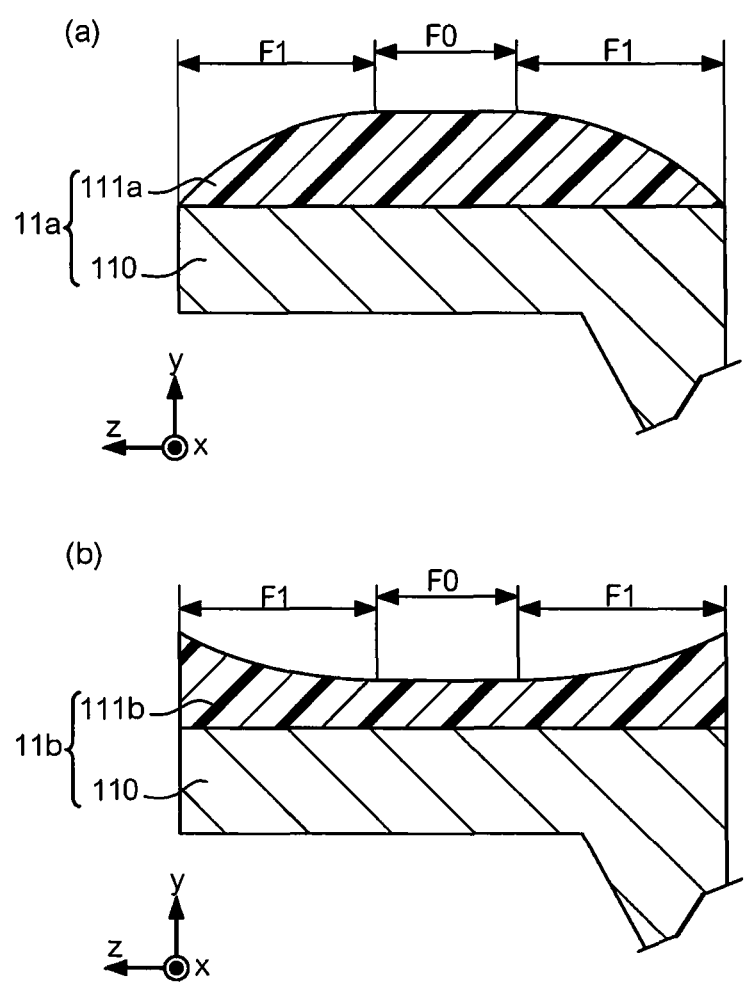
FIG. 7 is a diagram for illustrating an inner circumferential surface of a coating layer according to a modified example.

FIG. 7 is a diagram for illustrating an inner circumferential surface of the coating layer according to the modified example. In FIG. 7(a), bearing 11a is the same as bearing 11, except that coating layer 111a is provided on the inner circumferential surface side of base material 110 in the above-described embodiment. Coating layer 111a differs from the above-described coating layer 111 in that it includes the above-described surface F1 on both ends in the +z direction and the −z direction of bearing 11a. Also, surface F1 of coating layer 111a has a curved shape that is convex in the +y direction when cut by a plane passing through center line O11. That is, in the example shown in FIG. 7(a), the thickness of peak portion B at the center in the direction of the crank shaft 13 is greater than the thickness of peak portion B at the end. This is an example of a mode in which the thickness of peak portion B at the center in the direction of crank shaft 13 and the thickness of peak portion B at the end in the direction of crank shaft 13 are different.

With this configuration, even if crank shaft 13 is inclined clockwise or counterclockwise with respect to the center line of bearing 11a, crank shaft 13 is supported at a location on surface F1, and therefore heat generation and seizure of bearing 11a are suppressed in comparison with a case of not having this configuration.

Also, in FIG. 7(b), bearing 11b is the same as bearing 11, except that coating layer 111b is provided on the inner circumferential surface side of base material 110 in the above-described embodiment. Coating layer 111b is the same as the above-described coating layer 111a in that the above-described surface F1 is included on both ends in the +z direction and the −z direction of the bearing 11b, but surface F1 of the coating layer 111b has a curved shape that is convex in the +y direction when cut by a plane passing through center line O11. That is, in the example shown in FIG. 7(b), the thickness of peak portion B at the center in the direction of crank shaft 13 is less than the thickness of peak portion B at the end. This is an example of a mode in which the thickness of peak portion B at the center in the direction of crank shaft 13 and the thickness of peak portion B at the end in the direction of crank shaft 13 are different.

With this configuration, there is a possibility that wear will occur because crank shaft 13 strongly comes into contact with the end portions of coating layer 111b, but because lubricating oil is less likely to leak from both ends and is easy to hold between bearing 11b and crank shaft 13, heat generation and seizure of bearing lib is suppressed in comparison with the case of not including this configuration.

The invention claimed is:

1. A bearing comprising:
   a tubular member for containing a shaft on an inner circumferential surface side, the inner circumferential surface being approximately flat in a cross section in parallel to an axial direction of the shaft; and
   a coating layer that coats the inner circumferential surface, a plurality of grooves being provided therein so as to intersect the axial direction of the shaft, and peak portions formed between the adjacent grooves coming into contact with an outer circumferential surface of the shaft so as to support the shaft,
   wherein a thickness from the inner circumferential surface to a top of the peak portion at a center in the axial direction of the shaft is greater than a thickness from the inner circumferential surface to a top of the peak portion at an end in the axial direction of the shaft, and in the cross-section parallel to the axial direction of the shaft, a line connecting tops of the peak portions is parallel to the inner circumferential surface in a region including the center of the coating layer in the axial direction of the shaft and is tapered toward an edge in another region including the edge of the coating layer in the axial direction of the shaft.

2. The bearing according to claim 1, wherein the thickness of the peak portion at the center in the axial direction of the shaft is thinner than the thickness of the peak portion at the end in the axial direction of the shaft.

3. The bearing according to claim 1, wherein a maximum value for a height difference between thinnest portions of the grooves is smaller compared to a maximum value of a height difference between thicknesses of the peak portions.

4. The bearing according to claim 1, wherein intervals of the grooves at the center and at the end in the axial direction of the shaft are different from each other.

5. The bearing according to claim 1, wherein a maximum value for the height difference between the thinnest portions of the grooves is smaller than a diameter tolerance of the shaft.

6. The bearing according to claim 1, wherein in the coating layer, a region exists in which an interval of the grooves narrows and the peak portions become shallow as the end in the axial direction of the shaft is approached.

7. A scroll-type fluid machine, comprising:
   the bearing according to claim 1;
   a shaft supported by the bearing;
   a motor for rotating the shaft;
   a fixed scroll member that is provided with a spiral-shaped vane and is fixed to a housing; and
   a movable scroll member that is provided with a spiral-shaped vane whose spiral direction is the opposite of that of the vane of the fixed scroll member, forms a compression chamber along with the fixed scroll member, and is revolved by the shaft.

* * * * *